US009104866B2

(12) United States Patent
Yoo

(10) Patent No.: US 9,104,866 B2
(45) Date of Patent: Aug. 11, 2015

(54) PATTERN MATCHING ENGINE, TERMINAL APPARATUS USING THE SAME, AND METHOD THEREOF

(71) Applicant: SAMSUNG SDS CO., LTD., Seoul (KR)

(72) Inventor: InSeon Yoo, Kyeonggi-do (KR)

(73) Assignee: SAMSUNG SDS CO., LTD., Seoul (KR)

( * ) Notice: Subject to any disclaimer, the term of this patent is extended or adjusted under 35 U.S.C. 154(b) by 310 days.

(21) Appl. No.: 13/680,540

(22) Filed: Nov. 19, 2012

(65) Prior Publication Data

US 2013/0133067 A1 May 23, 2013

(30) Foreign Application Priority Data

Nov. 17, 2011 (KR) ........................ 10-2011-0120028

(51) Int. Cl.
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |

(52) U.S. Cl.
CPC .............. *G06F 21/56* (2013.01); *G06F 21/564* (2013.01)

(58) Field of Classification Search
CPC ..... G06F 21/56; G06F 21/561; G06F 21/562; G06F 21/563; G06F 21/564; G06F 21/565; G06F 21/566; H04L 29/06911; H04L 29/06918; H04L 63/1441; H04L 63/145; H04L 63/1416; H04L 63/1408; H04L 63/1458
USPC ........................................................ 726/22–24
See application file for complete search history.

(56) References Cited

U.S. PATENT DOCUMENTS

| 7,676,842 | B2 * | 3/2010 | Carmona et al. ................. 726/24 |
| 8,373,708 | B2 * | 2/2013 | Parikh et al. ................... 345/502 |
| 2007/0088955 | A1 * | 4/2007 | Lee et al. ........................ 713/176 |
| 2007/0240217 | A1 * | 10/2007 | Tuvell et al. .................... 726/24 |
| 2009/0273499 | A1 * | 11/2009 | Lang et al. ..................... 341/155 |
| 2010/0313092 | A1 * | 12/2010 | Xu et al. ........................ 714/738 |
| 2011/0314548 | A1 * | 12/2011 | Yoo ................................. 726/24 |

FOREIGN PATENT DOCUMENTS

| JP | 2005-522800 A | 7/2005 |
| WO | 2011/003958 A1 | 1/2011 |

OTHER PUBLICATIONS

Communication, dated for Jan. 14, 2014, issued by the Japanese Patent Office in counterpart Japanese Application No. 2012-251053.

* cited by examiner

*Primary Examiner* — Eleni Shiferaw
*Assistant Examiner* — Jing Sims
(74) *Attorney, Agent, or Firm* — Sughrue Mion, PLLC

(57) ABSTRACT

Provided is a pattern matching engine. The pattern matching engine calculates an error detection sign of target data and compares the calculated error detection sign with an error detection sign of a malware pattern DB. When the error detection sign of the target data and the error detection sign of the malware pattern DB are identical to each other, the pattern matching engine compares the target data with the malware pattern.

20 Claims, 9 Drawing Sheets

PATTERN MATCHING ENGINE, TERMINAL APPARATUS USING THE SAME, AND METHOD THEREOF

CROSS-REFERENCE TO RELATED PATENT APPLICATION

This application claims priority from Korean Patent Application No. 10-2011-0120028, filed on Nov. 17, 2011, in the Korean Intellectual Property Office, the disclosure of which is incorporated herein by reference in its entirety.

BACKGROUND

1. Field

Apparatuses and methods consistent with exemplary embodiments relate to a searching or pattern matching engine, a terminal apparatus using the same, and a method thereof.

2. Description of the Related Art

Computing devices are used in various ways. For example, mobile devices such as personal computers, servers, cellular phones, personal digital assistants (PDA), tablet terminals, and smartphones support typical information technology operations such as communication and the like. Computing devices also often support additional functions such as financial transactions and Internet shopping.

In many cases, however, such additional functions are implemented through a network. It is therefore highly likely that the devices, when used to perform such additional functions, are exposed to various dangers including malicious software such as malware and viruses.

SUMMARY

One or more exemplary embodiments may overcome the above disadvantage and other disadvantages not described above. However, it is understood that one or more exemplary embodiments are not required to overcome the disadvantage mentioned above.

One or more aspects of the exemplary embodiments provide a searching or pattern matching engine which can achieve high speed processing performance with a low load.

One or more aspects of the exemplary embodiments also provide a hardware-based searching or pattern matching engine which can achieve high-speed processing performance with a low load.

One or more aspects of the exemplary embodiments also provide a terminal apparatus including a searching or pattern matching engine which can achieve high speed processing performance and low load.

One or more aspect of the exemplary embodiments also provide a searching or pattern matching method which can achieve high speed processing performance with a low load.

According to an aspect of an exemplary embodiment, there is provided a pattern matching engine including: an error detection sign comparison unit which calculates an error detection sign of target data and compares the calculated error detection sign with an error detection sign of a malware pattern; and a matcher which, when the error detection sign of the target data and the error detection sign of the malware pattern are identical to each other, compares the target data with the malware pattern.

According to an aspect of another exemplary embodiment, there is provided a pattern matching engine including: an error detection sign comparison unit which calculates an error detection sign of sub-data, which is a part of target data, and compares the calculated error detection sign with an error detection sign of a malware pattern and a matcher which, when the error detection sign of the sub-data and the error detection sign of the malware pattern are identical to each other, compares the sub-data and the malware pattern.

According to an aspect of still another exemplary embodiment, there is provided a terminal apparatus including: a storage unit which stores a malware pattern; and a pattern matching engine which performs a process of comparing an error detection sign of target data with an error detection sign of the malware pattern, and, when the error detection sign of the target data and the error detection sign of the malware pattern DB are identical to each other, performs a process of comparing the target data with the malware pattern.

According to an aspect of still another exemplary embodiment, there is provided a terminal apparatus including: a storage unit which stores a malware pattern, and a pattern matching engine which performs a process (process "A") of comparing an error detection sign of sub-data, which is a part of target data, with an error detection sign of the malware pattern, and, when the error detection sign of the sub-data and the error detection sign of the malware pattern are identical to each other, performs a process B of comparing the sub-data with the malware pattern.

According to an aspect of still another exemplary embodiment, there is provided a searching or pattern matching method including: a first error detection sign comparing operation which calculates an error detection sign of target data and compares the calculated error detection sign with an error detection sign of a malware pattern, and, when the error detection sign of the target data and the error detection sign of the malware pattern are identical to each other, compares the target data with the malware pattern.

According to an aspect of still another exemplary embodiment, there is provided a searching or pattern matching method including: a second error detection sign comparing operation which calculates an error detection sign of sub-data, which is a part of target data, and compares the calculated error detection sign with an error detection sign of a malware pattern, and, when the error detection sign of the sub-data and the error detection sign of the malware pattern are identical to each other, compares the sub-data with the malware pattern.

According to one or more exemplary embodiments, high speed processing performance and low load can be achieved in searching or pattern matching.

According to one or more exemplary embodiments, the terminal apparatus performing searching or pattern matching can reduce battery consumption and process data at a high speed.

According to one or more exemplary embodiments, the searching or pattern matching engine may be sealed in an application processor of a terminal apparatus such as a mobile device in the form of an intellectual property core (IP core), so that the searching or pattern matching engine can process data at a high speed without causing overloading in the mobile device, which typically has very limited resources Additional aspects and advantages of the exemplary embodiments will be set forth in the detailed description, will be clear from the detailed description, or may be learned by practicing the exemplary embodiments.

BRIEF DESCRIPTION OF THE DRAWINGS

The above and other features and advantages will become more apparent through study of the below-described exemplary embodiments, with reference to the attached drawings, in which.

DETAILED DESCRIPTION OF EXEMPLARY EMBODIMENTS

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and those of ordinary skill in the art will fully understand the scope of the application. It will be understood that when an element, component, or unit is referred to or shown as communicating or connecting with another, the communication or connection can be direct or there can be intervening elements, components or units.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

The expression "an element is connected to another element" used herein implies not only a direct connection between the elements but also an indirect connection via an intervening element.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 1:
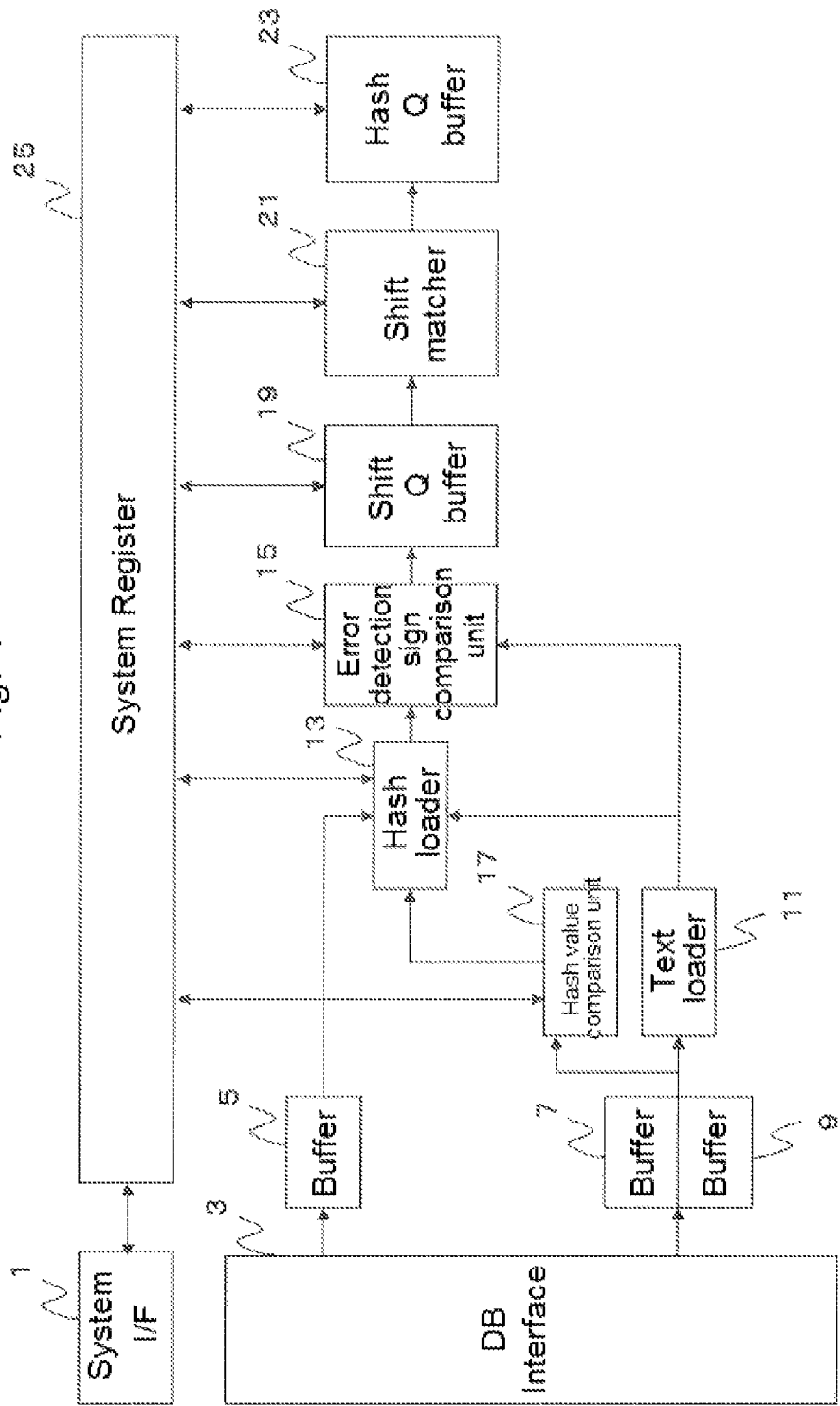
FIG. 1 is a block diagram illustrating a searching or pattern matching engine according to an exemplary embodiment.

FIG. 1 is a block diagram illustrating a searching or pattern matching engine according to an exemplary embodiment.

Referring to FIG. 1, a searching or pattern matching engine according to an exemplary embodiment (hereinafter, referred to as a 'matching engine') may include a system interface 1, a database (DB) interface 3, a plurality of buffers 5, 7, 9, 19, and 23, a text loader 11, a hash loader 13, an error detection sign comparison unit 15, a hash value comparison unit 17, a shift Q buffer 19, a shift matcher 21, and a hash Q buffer 23.

The system interface 1 may connect a system bus of an apparatus, on which the matching engine is loaded, to the matching engine. The DB interface 3 may connect a DB bus of the apparatus, on which the matching engine is loaded, to the matching engine.

The buffer 5 may receive reference data through the DB interface 3 and store the reference data. The reference data may be a malware pattern, a text string to be searched (i.e., a "searching text," hereafter), or a rule pattern. The malware pattern, the searching text, and the rule pattern are stored in a malware pattern DB, a searching text DB, and a rule pattern DB, respectively. The malware pattern includes patterns that relate to, and may be indicative of, malicious malware such as viruses, adware, spy ware, and/or Trojan horses. The searching text includes index words for searching. The rule pattern includes rules for defining blocking or allowing of packets.

According to an exemplary embodiment, the malware pattern DB may include patterns indicating malicious malware and may further include one or more of a hash value of each pattern (a pattern has value), and an error detection sign of each pattern (a pattern error detection sign).

According to an exemplary embodiment, the searching text DB may include index words, and may further include at least one of a hash value of each index word, and an error detection sign of each index word.

The buffers 7 and 9 are double buffers, and may alternate between receiving target data through the DB interface 3 and storing the target data. The buffers 7 and 9 may likewise alternate in transmitting stored target data to the text loader 11.

According to an exemplary embodiment, the target data may be a file and may be divided into a plurality of sub-data. The plurality of sub-data may be alternately stored in the buffers 7 and 9. In this specification, the target data and the sub-data may be generally understood to be interchangeable; on the other hand, where a distinction deserves explanation, the terms will be used in a more distinct manner.

The text loader 11 receives the sub-data from the buffers 7 and 9 alternately and stores the sub-data. The sub-data is input to the hash loader 13 and the error detection sign comparison unit 15. Also, the text loader 11 receives the sub-data from the buffers 7 and 9 alternately, and stores the sub-data, and outputs target data to the hash value comparison unit 17.

The hash loader 13 receives the reference data from the buffer 5 and receives the sub-data from the text loader 11.

According to an exemplary embodiment, the hash loader 13 calculates hash values of the sub-data and compares the hash values of the sub-data with hash values included in the reference data.

Table 1 is presented below by way of an example to explain the hash values of the reference data:

| Hash Value | Reference Data used in calculating Hash Values | Real Reference Data |
|---|---|---|
| X | abcifghi | abcifghidkigkedjgdgjduchdidkdldl . . . dkdld |
| X | igkedjgd | abcifghiigkedjgdgjduchdidkdldl . . . dkdld |
| Y | duchdidk | abcifghidkigkedjgdgjduchdidkdldl . . . dkdld |
| Z | kdldigio | kdldigiogkdicdkeidlclldidldldldl . . . dodlg |
| Y | giogkdic | kdldigiogkdicdkeidlclldidldldldl . . . dodlg |
| . | . | . |
| . | . | . |
| . | . | . |

For the sake of explanation, assume that the target data is made up of 100 bytes including 1, 2, 3, 4, 5, 6, 7, 8, . . . , D−1, D, D+1, D+2, D+3, . . . 100. In this case, the hash loader 13 obtains a hash value using the first three bytes (1, 2, 3) of the target data as sub-data. If the hash value obtained in this way is identical to one of the hash values of table 1, the sub-data is stored in the buffer 19. Herein, although the term "identical" is used, it is to be understood that the term is to be interpreted in the sense that a match is determined to exist to the degree of certainty appropriate to the implementation.

On the other hand, if none of the hash values of table 1 is identical to the obtained hash value, the hash loader 13 obtains a hash value using the next three bytes (2, 3, 4) as sub-data, and, when the hash value obtained in this way is identical to one of the hash values of table 1, the corresponding sub-data is processed by the error detection sign comparison unit 15, which will be described below. When none of the hash values of table 1 is identical to the obtained hash value, the hash loader 13 obtains a hash value using the next three bytes (3, 4, 5) as sub-data, and, when the obtained hash value is identical to one of the hash values of table 1, the corresponding sub-data is processed by the error detection sign comparison unit 15, which will be described below. The hash loader 13 repeats the above-described operation with respect to each of the sub-data. The above-presented numerical values or positions of the sub-data are merely an example and it should be understood that the present disclosure is not limited to these numerical values or positions.

According to another exemplary embodiment, the hash values might not be included in the reference data. In this case, the hash loader 13 calculates hash values of the reference data and compares the hash values of the reference data with the hash values of the sub-data.

The error detection sign comparison unit 15 may compare an error detection sign of the reference data with an error detection sign of the sub-data. Only when the error detection sign of the reference data and the error detection sign of the sub-data are identical to each other, the shift matcher 21 performs a matching operation between the sub-data stored in the shift Q buffer 19 and the reference data.

According to an exemplary embodiment, when the error detection sign of the reference data and the error detection sign of the sub-data are not identical to each other, the error detection sign comparison unit 15 may store a result of the comparison in a system register 25. In this case, the matching operation is not performed with respect to the corresponding sub-data.

According to an exemplary embodiment, sub-data that has an error detection sign identical to the error detection sign of the reference data is stored in the shift Q buffer 19. In this case, only when both the error detection sign and the hash value of the sub-data are identical to the error detection sign and the hash value of the reference data, the shift matcher 21 performs the matching operation.

The error detection sign mentioned herein may be a cyclic redundancy check (CRC) value or a check sum. However, these are merely examples, and should not be considered as limiting.

According to another exemplary embodiment, the error detection sign comparison unit 15 may receive the sub-data from the text loader and calculate an error detection sign of the sub-data, and may compare the error detection sign of the sub-data with the error detection sign of the reference data.

Figure 5:
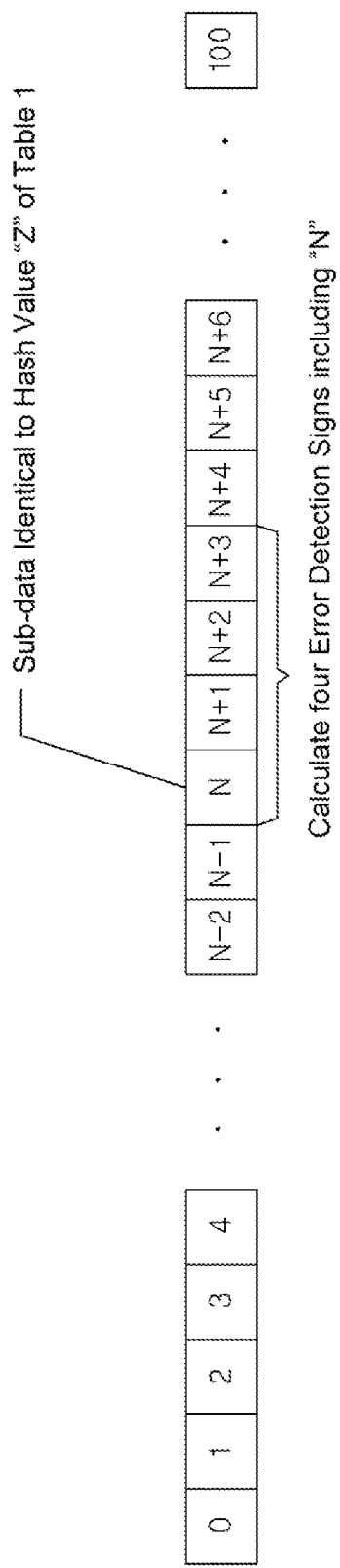
FIG. 5 is a view to explain a method for calculating an error detection sign according to an exemplary embodiment.

According to an exemplary embodiment, the error detection sign comparison unit 15 may calculate one error detection sign or a plurality of error detection signs regarding the sub-data prior to performing the matching operation with respect to the sub-data. Turning to FIG. 5, an explanation will be given regarding an approach to calculating an error detection sign, according to an exemplary embodiment. A method for calculating a plurality of error detection signs will also be explained with reference to FIG. 5 and table 1 above.

For example, assume that the reference data is made up of patterns P1, P2, P3, . . . PM, and the target data is made up of 100 bytes including 1, 2, 3, 4, 5, 6, 7, 8, . . . , D−1, D, D+1, D+2, D+3, D+4, D+5, . . . 100 (i.e., byte 0 is not part of the 100 bytes being considered in this example). Also, assume that a set of 1, 2, and 3 is referred to as a first position, a set of 2, 3, and 4, is referred to as a second position, . . . a set of D, D+1, and D+2 is referred to as an Nth position, a set of D+1, D+2, and D+3 is referred to as an N+1th position, a set of D+2, D+3, and D+4 is referred to as an N+2th position, and a set of D+3, D+4, and D+5 is referred to as an N+3th position, and it is assumed that the hash loader 13 obtains each hash value using three bytes as sub-data.

When the hash value of the Nth position of the sub-data is 'Z', the reference data having the hash value "Z" in table 1 is "kdldigiogkdicdkeidlclldidldldldl . . . dodlg". In this case, the error detection sign comparison unit 15 calculates an error detection sign (E_N) of the Nth position of the sub-data, an error detection sign (E_N+1) of the N+1th position, an error detection sign (E_N+2) of the N+2th position, and an error detection sign (E_N+3) of the N+3th position.

The error detection signs calculated above are compared with an error detection sign of "gkdicdke" of the reference data "kdldigiogkdicdkeidlclldidldldldl . . . dodlg", an error detection sign of "idlclldi", an error detection sign of "dldld-ldl". When all of the error detection signs of the sub-data are identical to the error detection signs of the reference data, the shift matcher 21 compares the sub-data with the reference data "kdldigiogkdicdkeidlclldidldldldl . . . dodlg".

The error detection sign of "gkdicdke" of the reference data, the error detection sign of "idlclldi", and the error detection sign of "dldldldl" may be calculated in advance and may be additionally included in table 1. Alternatively, the error detection sign comparison unit 15 may calculate the error detection sign.

That is, the error detection sign comparison unit 15 may calculate a plurality of error detection signs with respect to a single reference data. In the above exemplary embodiment, four error detection values are calculated by way of an example, but, it should be understood that the present disclosure is not limited to this numerical value.

The hash value comparison unit 17 receives the target data from the text loader 11, calculates a hash value of the target data by applying a hash algorithm, and compares the calculated hash value with a hash value of the reference data. When the hash value calculated for the target data is identical to the hash value of the reference data, the hash value comparison unit 17 may store a result of the comparing in the system register 25.

According to an exemplary embodiment, when the hash value calculated for the target data is identical to the hash value of the reference data, the target data is regarded as including a malware pattern, and the shift matcher 21 does not perform a matching operation with respect to the target data.

According to an exemplary embodiment, the hash algorithm may be a message-digest algorithm 5 (MD5) or a secure hash algorithm (SHA).

The shift Q buffer 19 stores sub-data when the hash value of the sub-data is identical to the hash value of the reference data, and the error detection sign of the sub-data is identical to the error detection sign of the reference data. The shift matcher 21 performs the matching operation with respect to only the sub-data stored in the buffer 19.

The shift matcher 21 stores a result of matching by comparing the sub-data with the reference data in the system register 25, and stores the sub-data in the buffer 23 when the sub-data is identical to the reference data.

When a part of the sub-data (a middle byte and a final byte) is matched with a part of the reference data and then they are identical to each other, the shift matcher 21 may compare the whole sub-data with the whole reference data. However, this is merely an example and the shift matcher 21 may compare the whole sub-data with the whole reference data regardless of whether the part of the sub-data and the part of the reference data are identical to each other or not.

The hash Q buffer 23 stores the sub-data identical to the reference data. A firmware (not shown), which operates the searching or pattern matching engine, may use the sub-data stored in this way to determine whether the target data contains a complex grammar pattern.

Although not shown, the firmware (not shown) to operate the searching or pattern matching engine may control the searching or pattern matching engine through the system interface 1 and/or the database interface 3.

The hash value comparison unit 17 may be omitted from the configuration of FIG. 1. Also, one or the other of the hash loader 13 and the error detection sign comparison unit 15 may be omitted, regardless of presence/absence of the hash value comparison unit 17. In such a case, the shift Q buffer 19 may store sub-data having a hash value identical to that of the reference data or sub-data having an error detection sign identical to that of the reference data, and the shift matcher 21 may perform a matching operation with respect to the sub-data stored in the shift Q buffer 19.

Also, although the error detection sign comparison unit 15 calculates an error detection sign for the sub-data in the above example, the error detection sign comparison unit 15 may calculate an error detection sign for the target data. In this case, the hash loader 13 is omitted, and the shift Q buffer 19 stores target data having an error detection sign identical to that of the reference data, and the shift matcher 21 performs a matching operation with respect to the corresponding target data.

Figure 2:
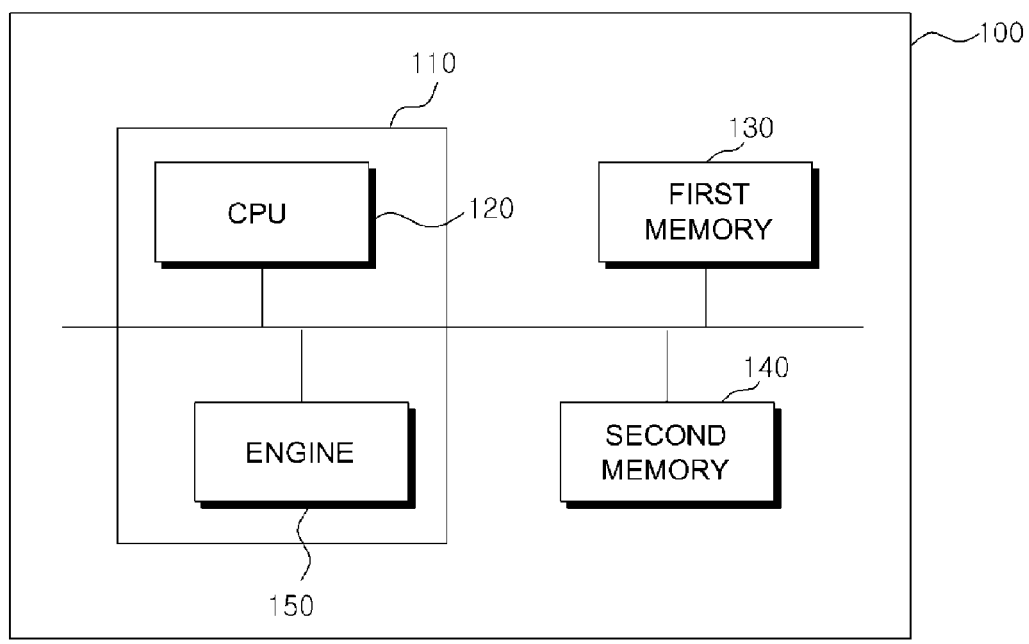
FIG. 2 is a block diagram illustrating a terminal apparatus including a searching or pattern matching engine according to an exemplary embodiment.

FIG. 2 is a block diagram illustrating a terminal apparatus including a searching or pattern matching engine according to an exemplary embodiment.

Referring to FIG. 2, a terminal apparatus 100 according to an exemplary embodiment may include an application processor 110, a first memory 130, and a second memory 140. Any apparatus that needs searching or pattern matching may be used as the terminal apparatus 100, e.g., a PC, a smartphone, a PDA, a mobile apparatus, an embedded device capable of networking, or a cellular phone.

The application processor 110 may include a central processing unit (CPU) 120 and a searching or pattern matching engine 150. The searching or pattern matching engine 150 may be one of the searching or pattern matching engines of FIG. 1 described above according to the exemplary embodiments.

According to an exemplary embodiment, as shown in FIG. 2, the searching or pattern matching engine 150 may be embedded in the application processor 110 in the form of an intellectual property core (IP core).

The first memory 130 includes the firmware to operate the searching or the pattern matching engine 15, and this firmware is loaded into the second memory 140 and subsequently the pattern matching engine operates according to the thus-loaded firmware.

The searching or pattern matching engine 150 may include a system interface and a DB interface, as described above with reference to FIG. 1, and the firmware may control the searching or the pattern matching engine 150 through these interfaces.

Figure 3:
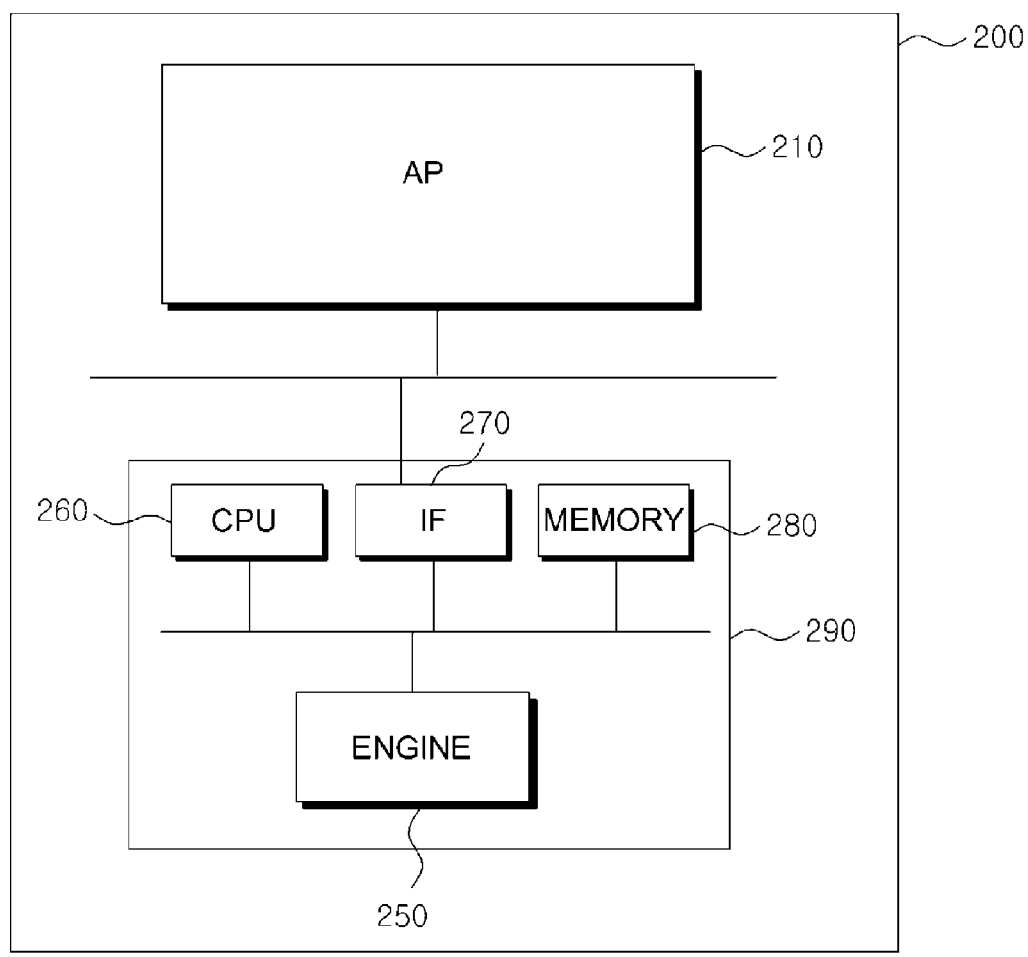
FIG. 3 is a block diagram illustrating a terminal apparatus including a searching or pattern matching engine according to another exemplary embodiment.

Referring to FIG. 3, a terminal apparatus 200 according to another exemplary embodiment may include an application processor 210 and a system-on-a-chip (SOC) 290. Although not shown, applications that are operated under control of the application processor 210 may also be included.

The SOC 290 may include a CPU 260, an interface 270, a memory 280, and a searching or pattern matching engine 250. The searching or pattern matching engine 250 may be one of the searching or pattern matching engines of FIG. 1, described above, according to the exemplary embodiments.

A firmware is loaded into the memory 280 in order to control the searching or pattern matching engine 250 and controls the searching or pattern matching engine 250 using the CPU 260.

The interface 270 may connect the SOC 250 and the applications operated by the application processor 210. For example, the interface 270 may include interfaces to permit interaction with an application such as a web browser, a user interface application for anti-malware scanning, and/or a searching application. Such applications may, for example, be operated by the application processor (AP) 210.

The searching or the pattern matching engine described above with reference to FIGS. 1 to 3 may be changed in various forms, and for example, the searching or the pattern matching engine may be one of i) a searching engine (SC engine) to scan search terms, ii) a pattern matching engine (an anti-malware (AM) engine) to scan malware, and iii) a firewall engine (FW engine) to filter packet data.

Figure 8:
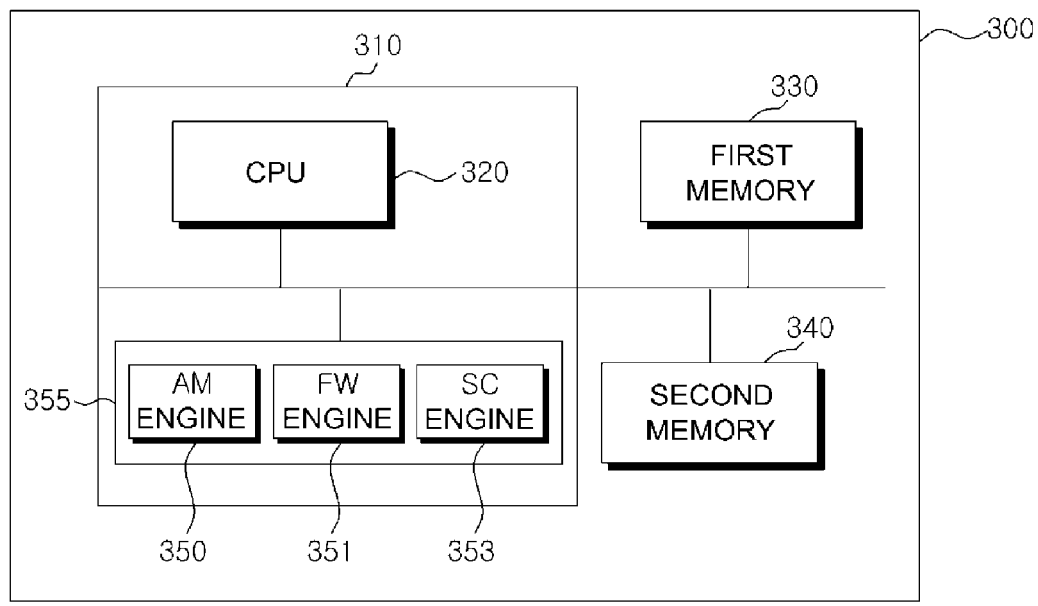
FIG. 8 is a block diagram illustrating a terminal apparatus including a searching or pattern matching engine according to another exemplary embodiment.

For example, FIG. 8 is a block diagram illustrating a terminal apparatus including a searching or pattern matching engine according to another exemplary embodiment, as a variation of the embodiment of FIG. 2.

Referring to FIG. 8, a terminal apparatus 300 according to another exemplary embodiment includes an application processor 310, a first memory 330, and a second memory 340. Operations of the elements that have the same numbers in the ten's place and the one's place as those of the elements of FIG. 2 are the same as the operations of the elements in FIG. 2, or sufficiently similar that an additional detailed description would be largely redundant.

The application processor 310 may include a CPU 320 and an engine unit 355 which itself implements or includes a plurality of engines.

The engine unit 355 may include a searching engine (SC engine) 353 to scan search terms, a pattern matching engine (anti-malware (AM) engine) 350 to scan malware, and a firewall (FW) engine 351 to filter packet data. These engines may be the searching or pattern matching engine described above according to the exemplary embodiments.

According to the exemplary embodiment of FIG. 8, the engine unit 355 may be embedded in the application processor 310 in the form of an IP core and may include the plurality of engines (the AM engine, the SC engine, and the FW engine) as described above.

Operations of the AM engine 350, the SC engine 353, and the FW engine 351 are the same as the operation of the searching or pattern matching engine of FIG. 2 or similar to it. That is, the AM engine 350 matches a mal-ware pattern DB and target data (for example, a file) and determines whether the malware pattern DB and the target data are identical to each other. The SC engine 353 matches a searching text DB and target data (for example, search terms) and determines whether the target data is included in the searching text DB. Also, the FW engine 351 matches a rule pattern DB and target data (for example, packet data) and determines whether the rule pattern DB and the target data are identical to each other, and may block or allow exchange of the target data with an external apparatus according a result of the matching.

Although not shown in FIG. 8, the terminal apparatus 300 may further include a storage unit to store reference data (for example, a malware pattern DB, a searching text DB, or a rule pattern DB), and may further include a network interface card (NIC) to receive or transmit packet data from or to an external apparatus. The FW engine 351 may determine whether to block or allow the packet data that is received from the external apparatus through the NIC prior to transmitting the packet data to an application such as a web browser. Also, the FW engine 351 may also determine whether to block or allow the packet data to be transmitted to the external apparatus, and, when it is determined that the packet data is allowed to be transmitted, transmits the packet data to the external apparatus through the NIC.

Figure 9:
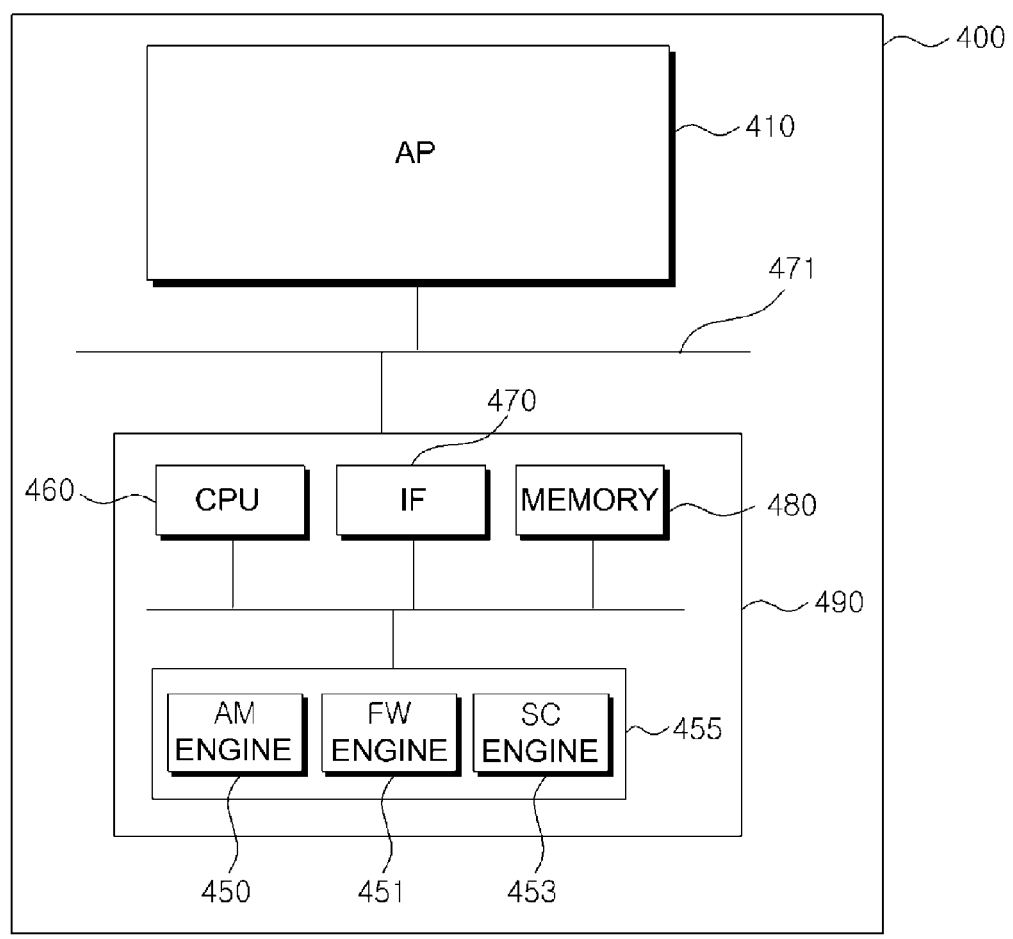
FIG. 9 is a block diagram illustrating a terminal apparatus including a searching or pattern matching engine according to another exemplary embodiment.

FIG. 9 is a block diagram illustrating a terminal apparatus including a searching or pattern matching engine according to another exemplary embodiment, as a variation of the embodiment of FIG. 3.

Referring to FIG. 9, a terminal apparatus 400 according to another exemplary embodiment includes an application processor 410 and a SOC 490. Although not shown, the terminal apparatus 400 may further include applications operated under control of the application processor 410.

The SOC 490 may include a CPU 460, an interface 470, a memory 480, and an engine unit 455. The engine unit 455 may include a searching engine (SC engine) 453 to scan search terms, a pattern matching engine (AM engine) 450 to scan malware, and a FW engine 451 to filter packet data, and these engines may be the searching or the pattern matching engines described above according to the exemplary embodiments.

Operations of the elements of FIG. 9 that have the same digits in the ten's and one's place as those of the elements of FIG. 3 are the same as the operations of the elements in FIG. 3 or similar to them, and thus a detailed description is omitted.

Figure 4:
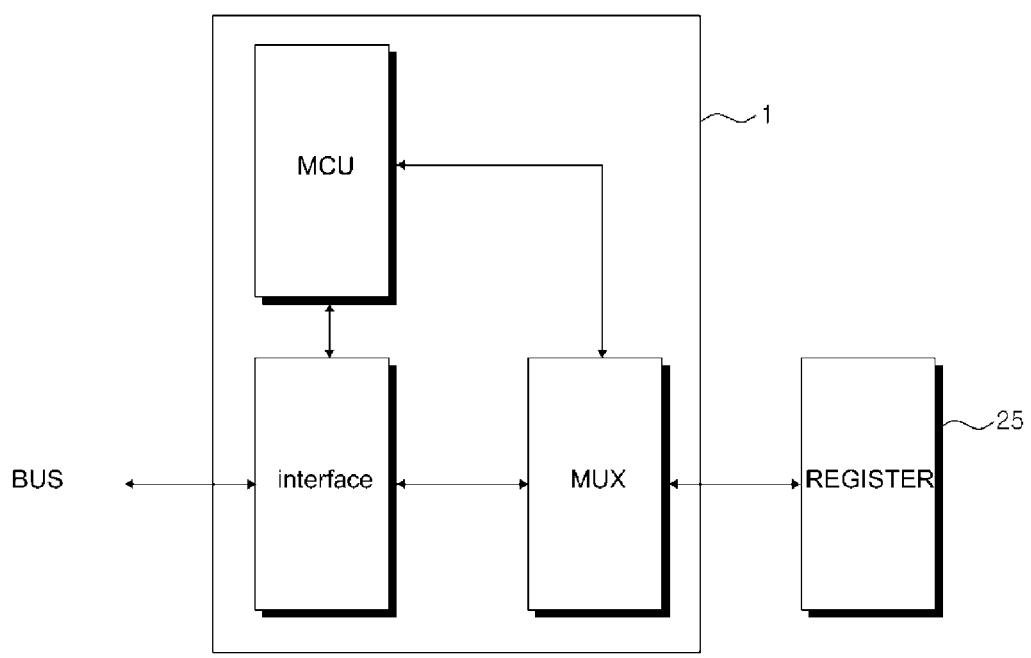
FIG. 4 is a block diagram illustrating a system interface according to an exemplary embodiment.

Operations of the AM engine 450, the SC engine 453, and the FW engine 451 are the same as the operation of the searching or pattern matching engine of FIG. 4 described above or similar to it. That is, the AM engine 451 matches a malware pattern DB and target data (for example, a file) and determines whether the malware pattern DB and the target data are identical to each other. The SC engine 453 matches a searching text DB and target data (for example, search terms) and determines whether the target data is included in the searching text DB. Also, the FW engine 451 matches a rule pattern DB and target data (for example, packet data) and determines whether the rule pattern DB and the target data are identical to each other, and may block or allow exchange of the target data with an external apparatus according to a result of the matching.

Although not shown in FIG. 9, the terminal apparatus 400 may further include a storage unit to store reference data (for example, a malware pattern DB, a searching text DB, or a rule pattern DB), and may further include a NIC to receive or transmit packet data to or from an external apparatus. The FW engine 451 may determine whether to block or allow the packet data that received from the external apparatus through the NIC prior to transmitting the packet data to an application such as a web browser. Also, the FW engine 451 may determine whether to block or allow the packet data to be transmitted to the external apparatus, and when it is determined that the packet data is allowed to be transmitted, may transmit the packet data to the external apparatus through the NIC. The NIC may be embedded in the SOC 490 and mounted and/or may be connected to a bus 471.

When the NIC is embedded in the system on chip 490 and mounted (hereinafter, referred to as a 'SOC NIC'), packet data may be received from an external apparatus through the SOC NIC. The packet data received through the SOC NIC is transmitted to the FW engine 451. When the FW engine 451 determines that the packet data is allowed to be transmitted, the packet data is transmitted to an application which processes packet data. On the other hand, when the packet data is to be transmitted to an external apparatus, the packet data is transmitted to the FW engine 451 first, and when the FW engine 451 determines that the packet data is allowed to be transmitted, the packet data is transmitted to the external apparatus through the NIC.

When the NIC is connected to the bus 471 (hereinafter, referred to simply as a NIC), a similar operation is performed. That is, when packet data is received from an external apparatus through the NIC, the packet data is transmitted to the FW engine 451 of the SOC prior to being transmitted to a corresponding application, and the FW engine 451 determines whether to block or allow the packet data. Also, only the packet data that is allowed to be transmitted is transmitted to a corresponding application. On the other hand, when packet data is to be transmitted to an external apparatus, the packet data is transmitted to the FW engine first and the FW engine 451 determines whether to block or allow the packet data. When it is determined that the packet data is allowed to be transmitted, the packet data is transmitted to the application.

In FIGS. 8 and 9, the engine unit includes the three engines (the AM engine, the FW engine, and the SC engine). However, this is merely an example, and the engine unit may include one or two engines of the three engines. Alternatively, a searching or pattern matching engine is configured by a single hardware that uses the functions of the three engines.

FIG. 4 is a block diagram illustrating a system interface according to an exemplary embodiment.

Referring to FIG. 4, the interface 1 may include a system interface to connect to a system bus, an interface to connect to a micro controller unit, the micro controller unit (hereinafter, referred to as MCU) and a multiplexer (hereinafter, referred to as MUX).

According to an exemplary embodiment, information on a location in which target data to be scanned is stored, information on the size of the target data, and matcher information to be matched with the target data are all transmitted to the MCU through the MCU interface, and the MCU transmits such information to the registers 25 through the MUX. After that, the searching or pattern matching engine may be configurably operated based on the information stored in the registers 25.

An interrupt generated by the searching or pattern matching engine may be processed by the MCU.

The system registers 25 may include a register to operate the buffers of the searching or pattern matching engine, a register to perform searching or pattern matching, a register to detect an error, a register to match hash values, and a control register to control the above-described registers.

Figure 6:
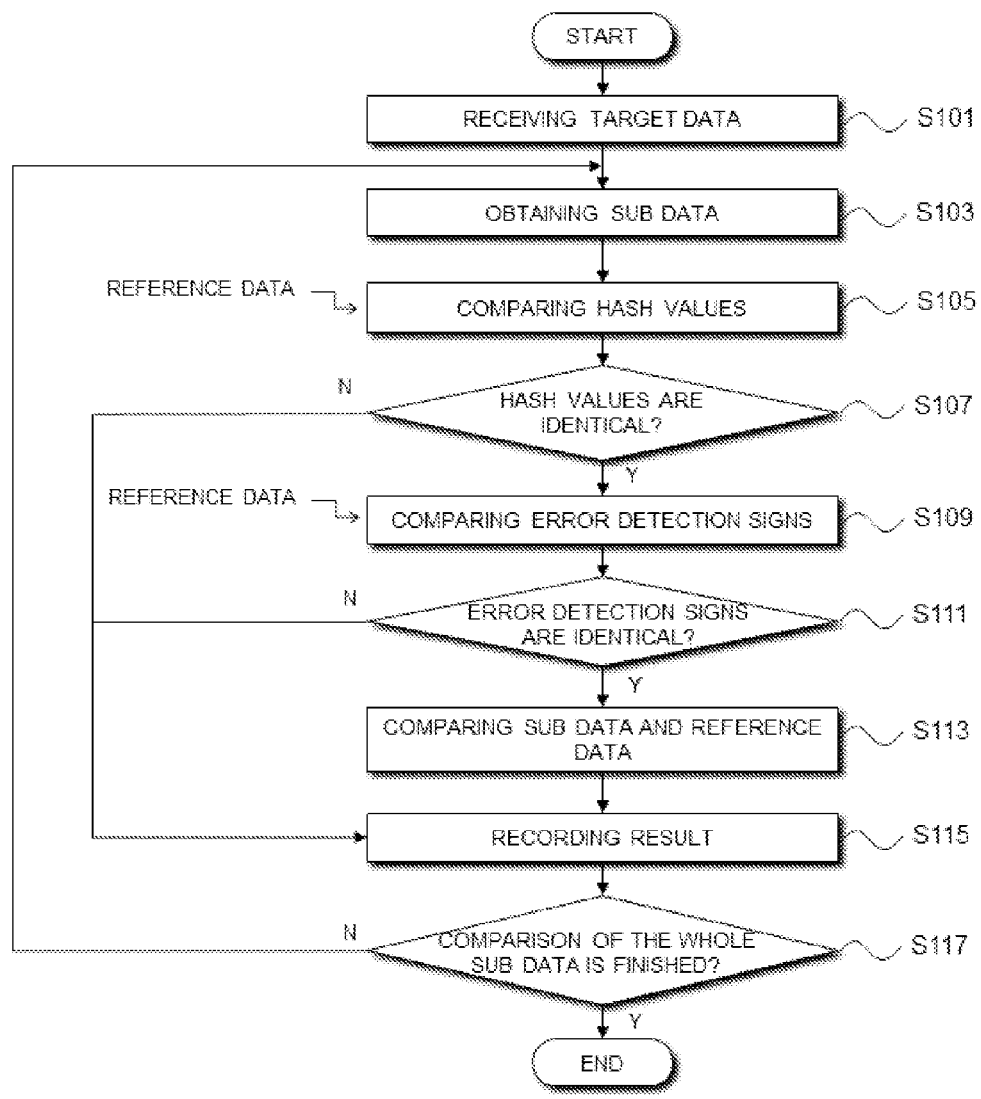
FIG. 6 is a flowchart illustrating a searching or pattern matching method according to an exemplary embodiment.

FIG. 6 is a flowchart to explain a searching or pattern matching method when the hash value comparison unit 17 is omitted, according to an exemplary embodiment.

Referring to FIGS. 6 and 1, a searching or pattern matching method according to an exemplary embodiment will be explained.

The buffers 7 and 9 receive target data and store sub-data (S101).

The text loader 11 accesses the buffers 7 and 9 and obtains the sub-data to be processed (S103).

The hash loader 13 calculates a hash value of the sub-data input through the text loader 11 and compares the hash value with a hash value of reference data (S105). When the hash value is identical to the hash value of the reference data (S107: Y), operation S109 is performed as will be described below, and, when not (S107: N), a result of the matching is recorded on a register (S115).

When the hash value is identical to the hash value of the reference data (S107: Y), the error detection sign comparison unit 15 receives the sub-data through the text loader 11, calculates an error detection sign of the received sub-data, and compares the calculated error detection sign with an error detection sign of the reference data (S109).

When the error detection sign of the sub-data is identical to the error detection sign of the reference data (S111: Y), the shift matcher 21 compares the sub-data stored in the shift Q buffer 19 with the reference data (S113).

The shift matcher 21 registers a matching result in the system register (S115). When the error detection sign of the sub-data is not identical to the error detection sign of the reference data (S111: N), the shift matcher 21 registers a matching result in the register (S115). When the comparison of the whole sub-data is not finished (117: N), operations S103 to S117 are repeated. When the comparison of the whole sub-data is finished (S117: Y), the shift matcher 21 finishes the matching operation of the target data.

Figure 7:
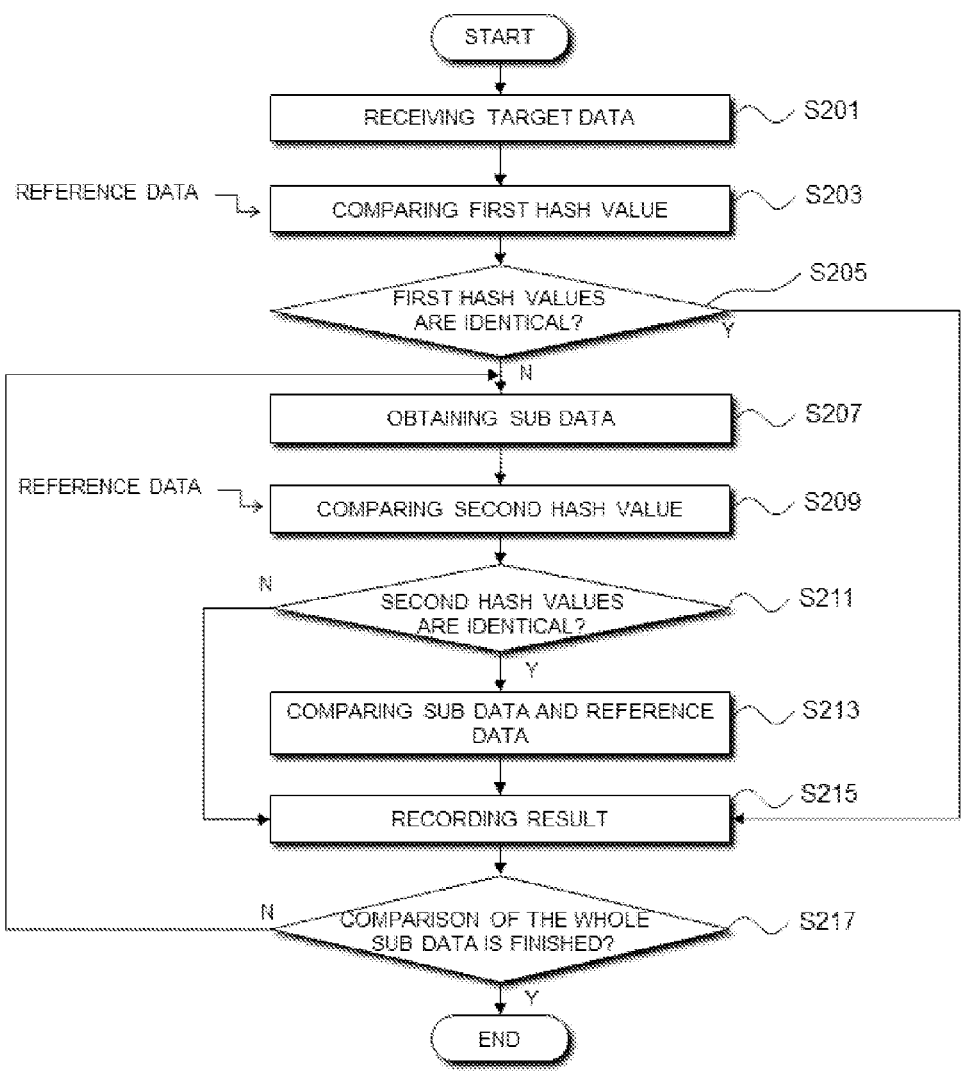
FIG. 7 is a flowchart illustrating a searching or pattern matching method according to another exemplary embodiment.

FIG. 7 is a flowchart illustrating a searching or pattern matching method when the error detection sign comparison unit 15 is omitted according to another exemplary embodiment.

Referring to FIGS. 7 and 1, a searching or pattern matching method according to another exemplary embodiment will be explained.

The buffers 7 and 9 receive target data and transmit the target data to the text loader 11 (S201).

The hash value comparison unit 15 receives text regarding the target data through the text loader 11, calculates a hash value of the whole text (hereinafter, referred to as a first hash value) by applying a hash algorithm to the received text, and compares the first hash value with a first hash value of the reference data (S203).

When the first hash values are identical to each other (S205: Y), the hash value comparison unit 15 records a result of the comparing on the register 25 (S215), and finishes a matching operation of the target data since the comparison of the whole sub-data is finished (S217: Y).

When the first hash values are not identical to each other (S205: N), the text loader 11 accesses the buffers 7 and 9 and obtains sub-data to be processed (S207). Next, the hash loader 13 calculates a hash value of the text (sub-data), which is received through the text loader 11, in every third byte (hereinafter, referred to as a second hash value), and compares the second hash value with a second hash value of the reference data (S209).

When the second hash values are identical to each other (S211: Y), the reference data and the target data are compared (S213), A result of the comparing in operation S213 is recorded on the register 25 (S215).

When the second hash values are not identical to each other (S211: N), a result of the comparing is recorded on the register (S215). When the comparison of the whole data is not finished (S217: N), operations S207 to S217 are repeated. When the comparison of the whole sub-data is finished (S217: Y), the matching operation of the target data is finished.

FIGS. 6 and 7 just illustrate the operations when the hash value comparison unit 17 is omitted and when the error detection sign comparison unit 15 is omitted. When another element is omitted or all of the elements of FIG. 1 exist, the operation thereof can be inferred in the light of the discussion already presented. For example, when the hash value comparison unit 17 and the hash loader 13 are omitted, operations S105 and S107 of FIG. 6 are omitted. When all of the elements of FIG. 1 exist, operations S109 and S111 of FIG. 6 are performed between operations S211 and 213 of FIG. 7.

Although FIG. 6 illustrates the error detection sign comparison unit 15 processing the sub-data, operations S103 to S107 and operation S117 are omitted when the error detection sign comparison unit 15 processes the target data. Also, in FIG. 7, operations S207 and S217 may be omitted and instead operations S109 and S111 of FIG. 6 may be performed. The case in which the error detection sign comparison unit 15 processes the target data has been described above with reference to FIG. 1, and so the detailed explanation already provided applies, mutatis mutandis, to such a situation.

Various technologies explained in the present discussion may be embodied by hardware or software, or an appropriate combination thereof. Therefore, a part or all of the elements of the searching or pattern matching engine and the method thereof may be configured by only hardware, a combination of hardware and software, or only software. When a part or all of the elements are configured by software, the present disclosure may be embodied in the form of a program code (that is, commands) realized in a substantial, non-transitory medium such as a floppy disk, a CD-ROM, a hard driver, or other computer readable storage media.

The searching or pattern matching engine, the terminal apparatus using the same and the method thereof may likewise be embodied in the form of a program code transmitted through a transmitting, transitory medium such as an electric wire or cable and an optical fiber or in other transmitting way, and such a transmitting medium corresponds to an exemplary embodiment of the present disclosure.

The operations discussed above and/or illustrated in the drawing figures may be understood to constitute various algorithmic approaches, or algorithms, for implementing the exemplary embodiments. Variations have been mentioned, suggested, and discussed at some length. Such algorithms and their variations will be understood to be adaptable to many and varied situations in accordance with sound software and hardware engineering principles.

While exemplary embodiments have been particularly shown and described above, it will be understood by those of ordinary skill in the art that various changes in form and details may be made therein without departing from the spirit and scope of the present invention as defined by the following claims.

What is claimed is:

1. A pattern matching engine, comprising:
   an error detection sign comparison unit which calculates an error detection sign of sub-data, which is a part of target data, and compares the calculated error detection sign with an error detection sign of a malware pattern;
   a matcher which, when the error detection sign of the sub-data and the error detection sign of the malware pattern are identical to each other, compares the sub-data with the malware pattern;
   a system register configured to store a result of comparison when the sub-data error detection sign is not identical to the malware pattern error detection sign;

a buffer configured to store sub-data having a respective error detection sign identical to the malware pattern error detection sign, and wherein at least one of the error detection sign comparison unit, the matcher, the system register, and the buffer is implemented as a hardware component.

2. The pattern matching engine as claimed in claim 1, further comprising a hash loader which compares a hash value of the sub-data with a hash value of the malware pattern; wherein, when the hash value of the sub-data and the hash value of the malware pattern are identical to each other, the matcher compares the sub-data with the malware pattern.

3. The pattern matching engine as claimed in claim 2, further comprising a hash value comparison unit which:
calculates a hash value of the target data by applying a hash algorithm, and
compares the calculated hash value with a hash value of the malware pattern;
wherein the error detection sign comparison unit, the matcher, and the hash loader are operated only after an indication that the hash value of the target data and the hash value of the malware pattern are not identical to each other.

4. The pattern matching engine as claimed in claim 3, further comprising a text loader which provides the sub-data to the hash loader and the error detection sign comparison unit.

5. The pattern matching engine as claimed in claim 2, further comprising a text loader which provides the target data to the hash value comparison unit.

6. The pattern matching engine as claimed in claim 5, further comprising a first buffer and a second buffer which alternately store the target data or the sub-data,
wherein the first buffer and the second buffer alternately provide the target data or the sub-data to the text loader.

7. A terminal apparatus, comprising:
a storage unit which stores a malware pattern;
a pattern matching engine which performs a process A of comparing an error detection sign of sub-data, which is a part of target data, with an error detection sign of the malware pattern;
wherein, when the error detection sign of the sub-data and the error detection sign of the malware pattern are identical to each other, the pattern matching engine also performs a process B of comparing the sub-data with the malware pattern, and
wherein, when the error detection sign of sub-data and the error detection sign of a malware pattern are not identical to each other, a result of comparison is stored in a system register, and sub-data that has an error detection sign identical to the error detection sign of a malware pattern is stored in a buffer.

8. The terminal apparatus as claimed in claim 7, wherein:
the pattern matching engine performs a process C of comparing a hash value of the sub-data with a hash value of the malware pattern; and
when the hash value of the sub-data and the hash value of the malware pattern are identical to each other, the pattern matching engine performs the process B.

9. The terminal apparatus as claimed in claim 8, wherein the pattern matching engine:
calculates a hash value of the target data; and
compares the calculated hash value with a hash value of the malware pattern; and, only when the hash value of the target data and the hash value of the malware pattern are not identical to each other, performs the process A, the process B, and the process C.

10. The terminal apparatus as claimed in claim 7, further comprising an application processor, wherein the pattern matching engine is embedded in a form of an intellectual property core (IP core) of the application processor.

11. The terminal apparatus as claimed in claim 7, wherein:
the pattern matching engine is configured in a form of a system-on-a-chip (SOC); and
wherein the storage unit storing the firmware is included in the SOC.

12. The terminal apparatus as claimed in claim 11, wherein the SOC further comprises a processor that operates the firmware.

13. A searching/pattern matching method, comprising:
calculating, by at least one processor, in a first error detection sign comparing operation, an error detection sign of target data;
comparing, by the at least one processor, as part of the first error detection sign comparing operation, the calculated error detection sign with an error detection sign of a malware pattern;
when the error detection sign of the target data and the error detection sign of the malware pattern are identical to each other, comparing, by the at least one processor, the target data with the malware pattern; and
when the error detection sign of sub-data and the error detection sign of a malware pattern are not identical to each other, storing, by the at least one processor, a result of comparison in a system register,
wherein sub-data that has an error detection sign identical to the error detection sign of a malware pattern is stored in a buffer.

14. The searching/pattern matching method as claimed in claim 13, further comprising:
calculating, by the at least one processor, a hash value of the target data; and
comparing, by the at least one processor, the calculated hash value with a hash value of the malware pattern,
wherein the first error detection sign comparing operation and the comparing of the target data are performed only when the hash value of the target data and the hash value of the malware pattern are not identical to each other.

15. A searching/pattern matching method, comprising:
a second error detection sign comparing operation, by at least one processor, which:
calculates an error detection sign of sub-data, which is a part of target data, and
compares the calculated error detection sign with an error detection sign of a malware pattern;
when the error detection sign of the sub-data and the error detection sign of the malware pattern are identical to each other, comparing, by the at least one processor, the sub-data with the malware pattern; and
when the error detection sign of sub-data and the error detection sign of a malware pattern are not identical to each other, storing, by the at least one processor, a result of comparison in a system register,
wherein sub-data that has an error detection sign identical to the error detection sign of a malware pattern is stored in a buffer.

16. The searching/pattern matching method as claimed in claim 15, further comprising comparing, by the at least one processor, a hash value of the sub-data with a hash value of the malware pattern, wherein the comparing the sub-data is performed when the hash value of the sub-data and the hash value of the malware pattern are identical to each other.

17. The searching/pattern matching method as claimed in claim 16, further comprising:
   calculating, by the at least one processor, a hash value of the target data, and
   comparing, by the at least one processor, the calculated hash value with a hash value of the malware pattern;
   wherein the second error detection sign comparing operation, the comparing of the sub-data, and the comparing of the hash value of the sub-data are performed only when the hash value of the target data and the hash value of the malware pattern are not identical to each other.

18. The searching/pattern matching method as claimed in claim 17, further comprising, when the hash value of the target data and the hash value of the malware pattern are identical to each other, determining, by the at least one processor, that the malware pattern is included in the target data, regardless of whether the error detection sign and the hash value of the target data are identical to the error detection value and the hash value of a malware pattern database (DB).

19. The searching/pattern matching method as claimed in claim 16, further comprising:
   forming, by the at least one processor, a plurality of sub-data from the target data, and
   entering, by the at least one processor, the sub-data into double buffers;
   wherein:
      the comparing of the hash value of the sub-data comprises:
         reading out the plurality of sub-data from one of the double buffers in sequence, and
         calculating hash values from the read-out sub-data in sequence;
      the second error detection sign comparing operation comprises:
         calculating error detection signs (1) of a first sub-data of the read-out sub-data that has a hash value identical to the hash value of the malware pattern, and (2) of at least one sub-data that follows the first sub-data, and
         comparing the calculated plurality of error detection signs with the error detection signs of the malware pattern; and
      the comparing the sub-data is performed only when the plurality of error detection signs are identical to the error detection signs of the malware pattern.

20. The searching/pattern matching method as claimed in claim 15, further comprising:
   forming, by the at least one processor, a plurality of sub-data from the target data; and
   entering, by the at least one processor, the sub-data into double buffers,
   wherein:
      the second error detection sign comparing operation further comprises reading out the plurality of sub-data from one of the double buffers in sequence and calculating error detection signs from the read-out sub-data; and
      the comparing of the target data is performed only when the error detection signs of the read-out sub-data are identical to the error detection signs of the malware pattern.

* * * * *